E. HODALJ.
FRUIT PICKER.
APPLICATION FILED APR. 12, 1916.

1,217,867.

Patented Feb. 27, 1917.

Witnesses.

Inventor
E. Hodalj.

Attorneys.

UNITED STATES PATENT OFFICE.

EMERICH HODALJ, OF SAN DIEGO, CALIFORNIA.

FRUIT-PICKER.

1,217,867.  Specification of Letters Patent.  Patented Feb. 27, 1917.

Application filed April 12, 1916. Serial No. 90,750.

*To all whom it may concern:*

Be it known that I, EMERICH HODALJ, a citizen of the United States, residing at San Diego, in the county of San Diego, State of California, have invented certain new and useful Improvements in Fruit-Pickers; and I do hereby declare the following to be a full, clear, and exact description of the invention, such as will enable others skilled in the art to which it appertains to make and use the same.

This invention relates to fruit pickers, and has for its primary object to provide a simple and efficient means for readily and easily collecting or gathering fruit growing upon trees or bushes without the necessity of resorting to step ladders, scaffolds or other elevating means.

A further object of the invention is to provide a device of this character and for this purpose which operates in such manner as to prevent scratching, scarring or abrading the fruit operated upon.

A still further object and particular object of the invention is to provide a device of the class under consideration which is of extremely simple and inexpensive construction, which is composed of but few parts all so arranged as to prevent breakage or derangement of the same which is easy of operation, which is strong and durable and yet possesses such lightness as to permit of the ready operation of the same, and which will prove thoroughly efficient in the attainment of the ends for which it is designed.

With these objects in view, together with others which will appear as the description progresses, the invention resides in the novel combination and arrangement of parts, all as will be described more fully hereinafter, illustrated in the drawings, and particularly pointed out in the claim.

The invention will be best understood by reference to the accompanying drawings, wherein.

Figure 1:
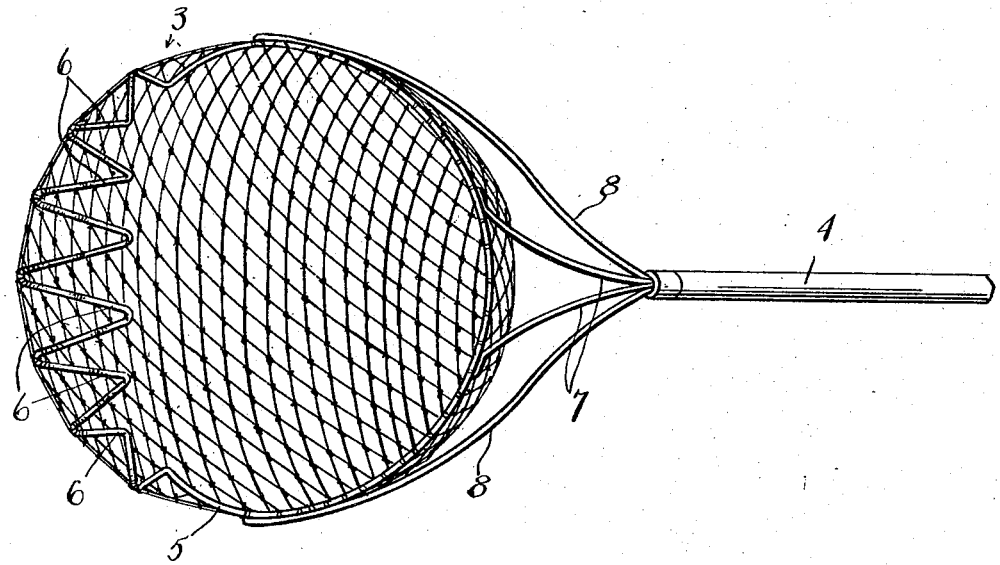
Figure 1 is a top plan view of a fruit picker embodying my invention.
Figure 2:
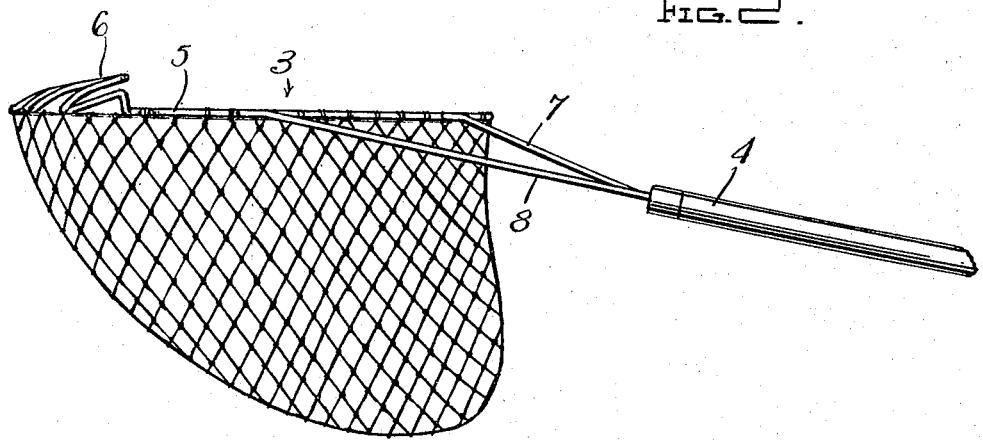
Fig. 2 is a side elevation of the device.

Referring now more particularly to the drawings, 3 indicates generally the picker or gatherer, and 4 is the handle thereof. The body portion of the gatherer is of such size as to enable the same to contain a small quantity of fruit, and the handle may be made of such length as to permit of the gatherer or container being extended to reach fruit growing at various high points upon the tree or bush.

The gatherer comprises a receptacle of cloth or netting, the said netting constituting a basket-like structure having its upper end open. This open end is supported by a piece of relatively heavy wire 5 bent into substantial ring-shape. The outer-most extremity of the ring is bent to provide a plurality of substantially V-shaped portions 6 providing teeth for engagement with the stems of the fruit. The channels between the various teeth may vary in depth as shown, and the innermost extremities of the teeth project into substantially the same line transversely of the ring wire. The fabric constituting the container or receptacle is secured at the outer end portion of the ring to the base portions of the teeth 6. It will also be observed that the teeth projecting inwardly from the open end of the receptacle incline upwardly therefrom, whereby the fruit may be readily engaged by the said teeth in the operation of the device.

Wires or bars 7 extend from the innermost edge of the ring slightly downwardly and outwardly therefrom to be connected at their free ends to the staff or handle portion 4. Brace wires 8 connect the opposite sides of the ring 5 with the handle, this construction providing a rigid connection between the picker or gatherer and the staff or pole 4. It is also to be observed that the arrangement enables the gatherer to be disposed with its open end at an angle to the pole whereby the picking or gathering operation is greatly facilitated.

While the above is a description of the preferred embodiment of the invention, it is apparent that the same is susceptible of various changes in the details of construction and arrangement of parts without departing from the spirit of the invention, and I reserve the right to make such changes as may fall fairly within the scope of the claim.

What is claimed, is:—

A fruit gatherer, comprising in combination, a continuous wire strand forming a series of teeth which decrease in height toward each end of the series, a substantially semi-circular frame joining the opposite end of the series of teeth, the inner extremities of the teeth forming a substantially straight line across the frame and being bent upwardly out of the plane of the frame in position to engage the fruit stems, a pair of supporting bars extending from the rear of said frame, a pair of braces extending from the sides of said frame and joining said supporting bars, a handle receiving all of said bars and braces and a net suspended from the bases of the teeth and the frame.

In testimony whereof, I affix my signature, in the presence of two witnesses.

EMERICH HODALJ.

Witnesses:
 WILLIAM WEBER,
 WILLIAM C. VAUPEL.

Copies of this patent may be obtained for five cents each, by addressing the "Commissioner of Patents, Washington, D. C."